United States Patent
Geer et al.

(10) Patent No.: US 6,788,882 B1
(45) Date of Patent: Sep. 7, 2004

(54) SYSTEMS AND METHODS FOR STORING A PLURALITY OF VIDEO STREAMS ON RE-WRITABLE RANDOM-ACCESS MEDIA AND TIME-AND CHANNEL- BASED RETRIEVAL THEREOF

(75) Inventors: James L. Geer, Hoover, AL (US); Ivan H. Darius, Richardson, TX (US)

(73) Assignee: Timesurf, L.L.C., Dallas, TX (US)

( * ) Notice: Subject to any disclaimer, the term of this patent is extended or adjusted under 35 U.S.C. 154(b) by 0 days.

(21) Appl. No.: 09/062,022

(22) Filed: Apr. 17, 1998

(51) Int. Cl.[7] .......................... H04N 5/225; H04N 5/76; H04N 5/91; H04N 5/781; H04N 5/85; H04N 5/90

(52) U.S. Cl. ...................... 386/116; 386/125; 725/39

(58) Field of Search ...................... 386/1, 83; 348/906, 348/512, 513; 725/92, 115, 145, 39, 48, 56, 55

(56) References Cited

U.S. PATENT DOCUMENTS

| | | | | |
|---|---|---|---|---|
| 5,241,428 A | * | 8/1993 | Goldwasser et al. | 386/109 |
| 5,283,659 A | * | 2/1994 | Akiyama et al. | 386/33 |
| 5,357,276 A | | 10/1994 | Banker et al. | 348/7 |
| 5,371,551 A | * | 12/1994 | Logan et al. | 386/112 |
| 5,477,263 A | * | 12/1995 | O'Callaghan et al. | 725/102 |
| 5,488,409 A | * | 1/1996 | Yuen et al. | 386/83 |
| 5,751,371 A | * | 5/1998 | Shintani | 348/564 |
| 5,771,334 A | * | 6/1998 | Yamauchi et al. | 386/95 |
| 5,774,170 A | * | 6/1998 | Hite et al. | 348/9 |
| 5,852,705 A | * | 12/1998 | Hanko et al. | 386/83 |
| 5,870,553 A | * | 2/1999 | Shaw et al. | 725/92 |
| 5,949,954 A | * | 9/1999 | Young et al. | 386/83 |
| 5,995,709 A | * | 11/1999 | Tsuge | 386/83 |
| 6,005,562 A | * | 12/1999 | Shiga et al. | 345/721 |
| 6,018,612 A | * | 1/2000 | Thomason et al. | 386/82 |
| 6,028,599 A | * | 2/2000 | Yuen et al. | 725/50 |
| 6,151,059 A | * | 11/2000 | Schein et al. | 348/906 |
| 6,253,375 B1 | * | 6/2001 | Gordon et al. | 725/88 |

* cited by examiner

*Primary Examiner*—Thai Tran
*Assistant Examiner*—Polin Chieu
(74) *Attorney, Agent, or Firm*—Slater & Matsil, L.L.P.

(57) ABSTRACT

A digital video recorder (DVR) and a method of operating the same. In one embodiment, the DVR includes: (1) a mass data storage unit that concurrently and continuously receives and digitally stores a plurality of channels and (2) a channel viewer, coupled to the mass data storage unit, that retrieves a portion of one of the plurality of channels from the mass data storage unit based on a received command and presents the portion on a video display device.

33 Claims, 12 Drawing Sheets

810

| PROGRAM | CHANNEL | RECORD DATE | RECORD TIME |
|---|---|---|---|
| ABC NEWS | 1 | 12/1/97 | 6:00PM |
| NBC LATE NIGHT | 3 | 12/2/97 | 10:00PM |
| ZEUS & CHEOPS | 8 | 12/1/97 | 10:00PM |
|  |  |  |  |

(810a, 810b, 810c, 810d)

820

| CHANNEL | PROGRAM | RECORD DATE | RECORD TIME |
|---|---|---|---|
| 1 | ABC NEWS | 12/1/97 | 6:00PM |
| 3 | NBC LATE NIGHT | 12/2/97 | 10:00PM |
| 8 | ZEUS & CHEOPS | 12/1/97 | 10:00PM |
|  |  |  |  |

(810b, 810a, 810c, 810d)

830

| RECORD DATE | RECORD TIME | PROGRAM | CHANNEL |
|---|---|---|---|
| 12/1/97 | 6:00PM | ABC NEWS | 1 |
| 12/2/97 | 10:00PM | NBC LATE NIGHT | 3 |
| 12/1/97 | 10:00PM | ZEUS & CHEOPS | 8 |
|  |  |  |  |

SYSTEMS AND METHODS FOR STORING A PLURALITY OF VIDEO STREAMS ON RE-WRITABLE RANDOM-ACCESS MEDIA AND TIME-AND CHANNEL- BASED RETRIEVAL THEREOF

TECHNICAL FIELD OF THE INVENTION

The present invention is directed, in general, to video storage and playback and, more specifically, to systems and methods for storing a plurality of video streams on re-writable random-access media and time- and channel-based retrieval thereof.

BACKGROUND OF THE INVENTION

Ever since the advent of television, the popular and useful programs and their air times have molded people's schedules. Examples such as the six o' clock news (during or after the family dinner) and prime-time shows are abundant. As viewer habits change and the choice of programming (channels) grows, people want to adapt television programming to their schedule, rather than the other way around.

Video cassette recorders (VCRs) have enabled people to tape certain programs at the time they are aired and view them later. The recording medium used in these devices is magnetic tape and is therefore inherently sequential and slow in access. The VCR, although extremely successful as a consumer device, has limited flexibility when the number of television channels increases. Also, the consumer has to remember to program the VCR to record the event. Commercially-available VCR+® technology has somewhat facilitated the process, but still requires tape management, scheduling and remembering when and what to program.

One frequently employed method of viewing television involves rapidly browsing ("surfing") television channels to search for a program of interest, to watch several programs at once, or to skip ubiquitous commercials. Surfing has become even more popular given the advent of cable and satellite television, wherein many dozens of channels are available for viewing at any given time. On currently available single-screen systems, surfing must be done in real time and as time progresses. In other words, a user can watch one channel and record another channel on a VCR, but the user cannot watch a recorded program and simultaneously record another (unless the user is endowed with multiple VCRs). One of the principle restrictions is that the user cannot go back in time on an arbitrary channel without making a conscious effort to record the channel in advance.

Ideally, a user should be able to walk up to his television set and be able to view, on demand and without delay, everything that he missed during some previous period of time (for instance one day), regardless of channel. Therefore, what is needed in the art is a fundamental increase in the flexibility afforded a user in viewing programs aired over multiple channels. Moreover, what is needed in the art is a way of harnessing the power of digital computers to give the user more power in determining what he wants to watch.

SUMMARY OF THE INVENTION

To address the above-discussed deficiencies of the prior art, the present invention provides a digital video recorder (DVR) and a method of operating the same. In one embodiment, the DVR includes: (1) a mass data storage unit that concurrently and continuously receives and digitally stores a plurality of channels and (2) a channel viewer, coupled to the mass data storage unit, that retrieves a portion of one of the plurality of channels from the mass data storage unit based on a received command and presents the portion on a video display device.

The present invention therefore introduces the broad concept of capturing multiple channels concurrently to allow a user to choose what to view both temporally and spatially (if a channel is thought of as a spatial dimension). The digital video recorder of the present invention remedies the shortcomings of traditional video recording methods. The DVR does this by combining an essentially limitless (only limited by the cost of the equipment) capability concurrently to record a number of channels on a random-access medium while being able concurrently to play back any of these channels for viewing.

"Continuously" is defined, for purposes of the present invention, as without interruption over at least a finite period of time. With respect recording of commercial television, "continuously" may connote indiscriminate inclusion of commercials, station identifications and the like. However, it should be understood that "continuously" does not preclude interruption. Certainly, a user may turn the DVR on or off or pause one or more channels. In some embodiments of the present invention, dead air time, commercials, credits or the like may not be recorded. In a more specific embodiment, the decision of what, or what not, to record is the user's.

A "channel" is defined, for purposes of the present invention, as a stream of video data (and any accompanying audio data). Channels typically correspond one-for-one with satellite, cable television or digital broadcast television channels.

In one embodiment of the present invention, the digital video recorder records the plurality of channels as a matter of course, and without being specifically prompted. This may be thought of as "automatic" recording. At any point in time, the DVR contains video data that covers a window of time (the length of which depends upon memory capacity) for each of the plurality of channels. The user therefore is relieved of the responsibility of starting and stopping recording, allowing the user to view any video recorded during the window of time.

In a related embodiment, the mass data storage unit stores the plurality of channels on a first-in-first-out basis. As the window of time moves forward, the newest video data can overwrite the oldest. Of course, other criteria may govern overwriting. Further, the window of time may vary depending upon the channel being recorded. The user may identify more important channels for which the window is extended or less important channels for which the window is shortened.

In one embodiment of the present invention, the mass data storage unit stores the plurality of channels in separate files based on channel and timeslot identification. In an alternative embodiment, the data storage unit stores the plurality of channels in a combined channel file. In an embodiment to be illustrated and described, specific formats for separate and combined channel files are presented. Those skilled in the art will recognize, however, that the broad scope of the present invention is in no way limited to a particular file-naming or data-structuring scheme for channel files.

In one embodiment of the present invention, the mass data storage unit stores the plurality of channels together with time information to allow the plurality of channels to be synchronized with respect to one another. The time information can synchronize corresponding portions of the plurality of channels that the DVR recorded concurrently. This allows a user to surf synchronized, prerecorded channels in a way that imitates the real-time channel surfing that the prior art constrains the user to do.

In one embodiment of the present invention, the channel viewer comprises a channel guide database containing pointers to locations in the mass data storage unit. The locations may correspond to starting points for individual programs. The channel guide database allows individual programs to be selected efficiently. However, the present invention does not require a channel guide database.

In one embodiment of the present invention, the channel viewer displays a channel guide on the video display device. The channel guide may provide information regarding a content of the plurality of channels. In a more specific embodiment, the channel guide contains links to locations in the mass data storage unit. The links maybe hypertext links, wherein a user can initiate retrieval and presentation of a particular portion of a selected channel simply by clicking on a particular location in the channel guide. Of course, those skilled in the art will readily perceive other ways of employing an electronic channel guide to advantage.

In one embodiment of the present invention, the DVR further includes a pointing device, cooperable with the channel viewer, that allows a user to issue the command. The pointing device, which may be a conventional mouse, allows a user to "navigate" the video display device in an intuitive manner. However, those skilled in the art will understand that the present invention is in no way limited to a particular type of input device.

In one embodiment of the present invention, the channel viewer presents the portion nonlinearly. Sections of the portion may therefore be skipped, repeated, reversed, randomized or presented at a rate that differs from real-time. In an embodiment to be illustrated and described, commercials or other tedious content may be skipped to advantage. This gives rise to viewing concepts, such as "catch-up viewing" as described hereinafter.

In one embodiment of the present invention, the mass data storage unit receives, digitally compresses and digitally stores the plurality of channels. Of course, the present invention does not require compression and is not limited to a particular type of compression.

In one embodiment of the present invention, the mass data storage unit is a redundant array of independent disks (RAID). Those skilled in the art are familiar with the structure and function of RAIDs and their ability to cause otherwise independent disks to cooperate to provide greater speed, reliability, storage capacity or a combination thereof.

In one embodiment of the present invention, the DVR further includes an archive storage unit, coupled to the channel viewer, that stores the portion selected for archiving. The archive storage unit may be a conventional, analog video tape recorder, digital video tape recorder, video disk recorder or other disk (such as commercially available Syqueset® and Jazz® disks). In a manner to be set forth below in greater detail, archiving allows the portion to escape overwriting.

In one embodiment of the present invention, the DVR further includes a channel selector, coupled to the mass data storage unit, that allows a user to identify the plurality of channels. Alternatively, the DVR may record all available channels indiscriminately. Selection of channels may be time-based (including, for example, more sports channels over the weekend). The present invention is not limited to a particular manner in which channels are selected for recording.

In one embodiment of the present invention, the mass data storage unit comprises a separate disk volume for each of the plurality of channels. In an alternative embodiment, the mass storage unit comprises a separate physical disk for each of the plurality of channels. Those skilled in the art will understand that the logical or physical structure of the underlying disk storage does not limit the scope of the present invention. However, the underlying structure may be optimized to increase recording or retrieval speed.

In one embodiment of the present invention, the plurality of channels are formatted in a selected one of: (1) NTSC analog TV, (2) PAL/SECAM analog TV, (3) digital TV, (4) analog HDTV and (5) digital HDTV. Those skilled in the art will perceive that the principles of the present invention are applicable to any video (or audio) format.

In one embodiment of the present invention, the DVR selectively moves by one commercial time unit (CTU) within the one of the plurality of channels in response to the received command. The DVR can move forward or backward. In a more specific embodiment, the received command is employable to achieve catch-up viewing. In a manner to be illustrated and described, a user can command the DVR to skip commercials until the time of the portion being viewed merges with real time, at which point the user has "caught up" with the program being viewed.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 8 illustrates a block diagram of exemplary data structures for table of contents retrievals;

DETAILED DESCRIPTION

Figure 1:
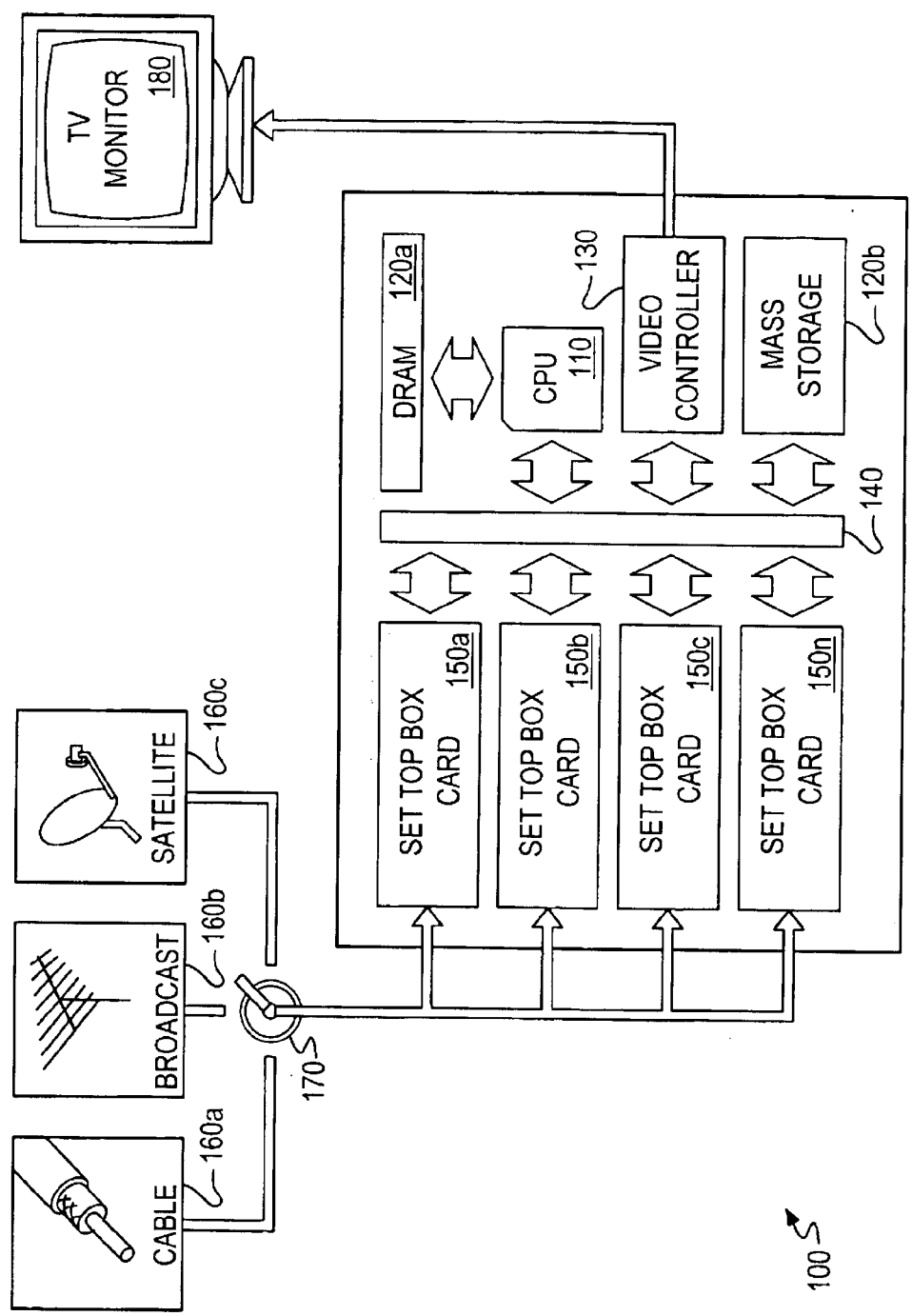
FIG. 1 illustrates a block diagram of an exemplary digital video recorder (DVR) constructed according to the principles of the present invention in which set-top box cards provide an interface between channel sources and a computer system.

The following Detailed Description is directed to very specific embodiments of the present invention. The systems, methods, (data, file and physical) structures and other details are provided solely as examples and in no way limit the scope of the present invention.

General Support for Time and Channel Surfing

The support of both channel and time surfing requires (at least) the temporal storage of more than one video channel (e.g., television or cable channels). If all channels available to the user in question are recorded for an unlimited amount of time, then it is, in principle, possible to support channel surfing at any moment later than the start of the recording process. In practice, a limited number of channels (e.g., the user's favorites) recorded over a limited amount of time (e.g., 24 hours) should support most users' channel and time surfing needs. As will be described in greater detail below, the requirements for such a system also enable "catch-up viewing" (joining a certain program in mid-broadcast and then, through skipping of commercials, catching-up with the real-time broadcast). In other words, time and channel surfing and catch-up viewing now become possible.

Channel surfing can be described as follows: a user, using the currently available technology in televisions and cable converters ("boxes") can, in rapid succession (but only in real-time, as time progresses) switch from one channel to another by either entering a channel number or hitting a channel "up" (or "down") button. In this context, the user has no access to the time variable. The only way for him to watch something that was broadcast prior to the current time is to use a VCR and view the recorded program.

Time surfing is similar to channel surfing, except that the user hops from one time (e.g., 6 p.m. yesterday) to another (e.g., 5 p.m. today) using a device similar to the channel changer. The previous (lower) times are the equivalent of the lower channel numbers; the later (higher) times are equivalent to the higher channel numbers. The user can freely time surf in either time direction. The only time-boundaries are that one cannot surf past now into the future (on the higher time side), and the current time minus the total recorded time (on the lower time side). Both of these boundaries move with time, as will be described in greater detail below.

The system requirements to support the above functionality cannot be met using traditional recording techniques such as used in VCRs, because of the inherently sequential nature of the recording medium, which inhibits the capability of recording (writing) in one place and playing back (reading) in another concurrently.

The present invention provides for all channels, or some subset thereof, to be concurrently recorded, at all times, onto a random-access medium. In one of the illustrated embodiments, the recording is done on a computer disk connected to the traditional bus of a personal computer (PC). Other implementations can look at proprietary bus, central processing unit and input card technologies to implement the functionality.

As the recording medium reaches its capacity, the oldest recorded video is overwritten on a first-in-first-out (FIFO) basis. Obviously the size of the medium determines how many channels can be recorded for how long. With current and projected (within 2 to 3 years) technology recording 10 to 15 channels for 24-hour periods is feasible.

For the remainder of this Detailed Description, the term "all channels" is defined as the number of video sources available and of interest to a given user.

To support the above functionality, one of the illustrated embodiments uses a digital recording technique of the compressed digital video signals. Converting the classic video (or television) signals to compressed digital data streams can be accomplished in a variety of ways. A growing number of cable and satellite television companies are providing their television signals in compressed digital format, usually MPEG II. Proprietary schemes based on technologies such as Wavelets or other compression techniques can be envisioned. In the near future, broadcast television stations are expected to begin broadcasting digital signals and compressed digital signals.

Direct broadcast satellite television uses a dish that receives the satellite transmission, the output of the dish is fed into a device called a set-top box. The set-top box translates the satellite signal to a signal usable by a television. The embodiment illustrated and described herein accordingly contains a sub-function called a "set-top box." The set-top box function can process a signal as follows: (1) radio frequency (RF) tuning (to select a channel or group of channels), (2) down conversion and phase splitter, (3) analog to digital (A/D) conversion and (4) quadratic phase shift keying (QPSK) with forward error correction (FEC), to produce the compressed digital signal.

In a typical set-top box, the output can be an analog NTSC RF signal for one selected channel or a compressed digital signal for one selected channel. Analog television channels, such as the one carried on cable television, use a subset of the set-top box functionality to filter the one channel being watched from the total signal.

To support the recording of multiple channels, multiple video streams must be recorded. One way to record multiple channels concurrently is to duplicate the set-top box functionality a number of times equal to the number of channels to be recorded.

Turning now to FIG. 1, illustrated is a block diagram of an exemplary DVR, generally designated 100, constructed according to the principles of the present invention in which set-top box cards provide an interface between channel sources and a computer system (not separately referenced). A central processing unit (CPU) 110 is coupled to dynamic random access memory (DRAM) 120a (memory other than DRAM is within the scope of the present invention) and, via a bus 140, to video signal generation circuitry 130, typically provided in the form of a card, and to a mass storage unit 120b, which may be embodied in the form of a single drive or a RAID. A plurality of set-top box cards 150a, 150b, 150c . . . 150n are coupled to the bus 140, allowing data communication to take place between the set-top box cards 150a, 150b, 150c . . . 150n and the CPU 110 or directly between the set-top box cards 150a, 150b, 150c . . . 150n and the DRAM 120a or the mass storage unit 120b.

Channel sources 160a, 160b, 160c (corresponding, in the illustrated embodiment, to cable television, broadcast television and satellite sources, respectively) are coupled to inputs (not separately referenced) of the set-top box cards 150a, 150b, 150c . . . 150n via a channel source selector 170. The channel selector 170 allows a user to select a particular channel source 160a, 160b, 160c. Finally, an output (not separately referenced) of the video signal generation circuitry 130 is coupled to a video display device 180, such as a video monitor or television set 180.

The plurality of set-top box cards 150a, 150b, 150c, 150n allow selection (tuning) of proper channels, perform any A/D conversion needed (such as performed in the current generation of set-top boxes) and provide the signal(s) in compressed digital format for storing on the DVR's recording media. For uncompressed channels, the card also performs compression.

Alternatively, one set-top box per channel can be used. So-called generation III set-top boxes provide a compressed digital video feed, as well as an uncompressed NTSC (analog) output. The compressed digital video signal could be connected to the PC, via some type of standard input device, such as Firewire (IEEE 1394).

Figure 2:
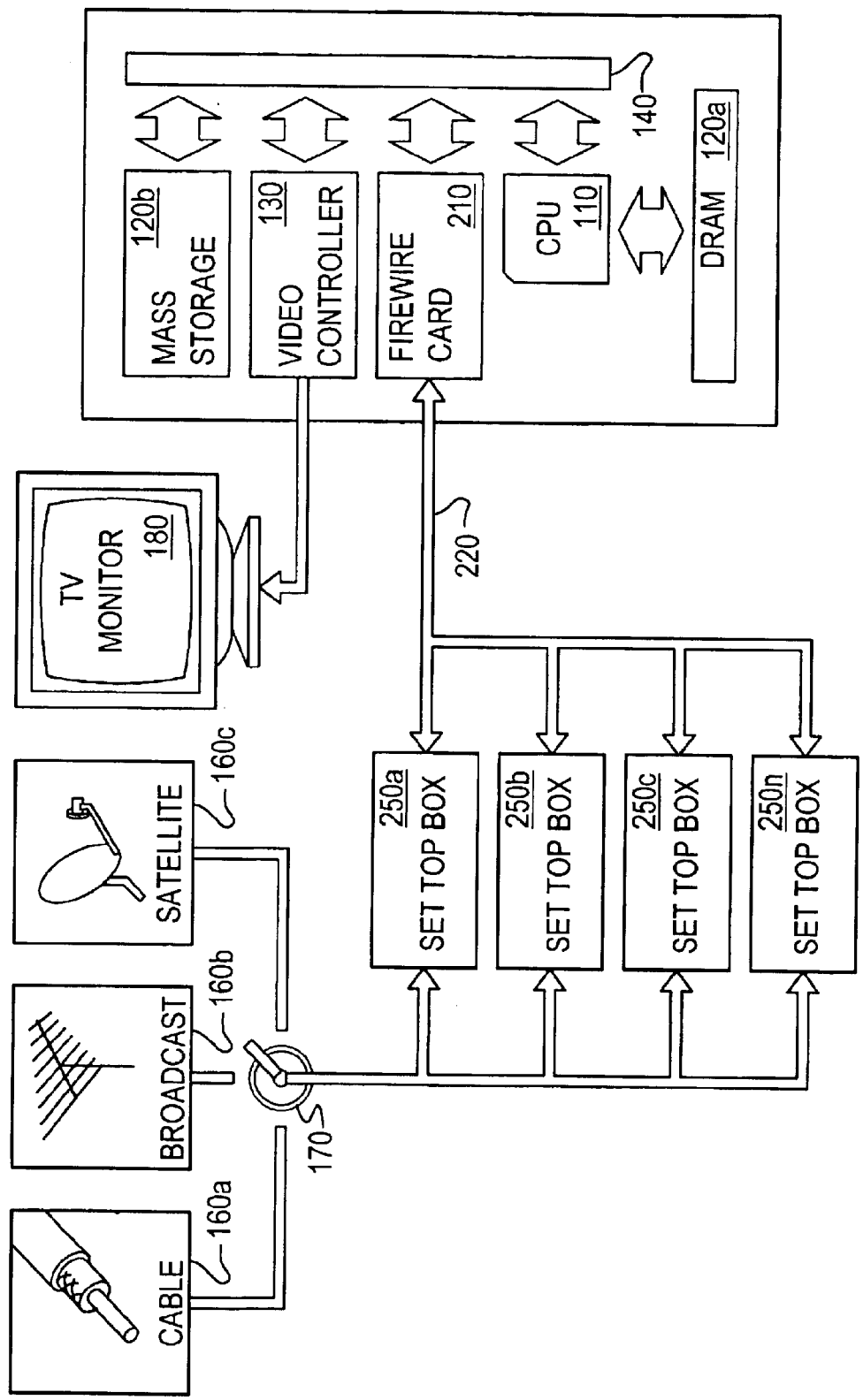
FIG. 2 illustrates a block diagram of another exemplary DVR constructed according to the principles of the present invention wherein set-top boxes provide an interface to an IEEE 1394 Firewire Bus.

Turning now to FIG. 2, this embodiment is illustrated. Instead of the plurality of set-top box cards 150a, 150b, 150c, 150n of FIG. 1 being coupled directly to the bus 140, a Firewire interface card 210 is coupled to the bus 140. A Firewire bus 220 couples the Firewire interface card 210 to the plurality of set-top boxes 250a, 250b, 250c, 250n. Like each of the plurality of set-top box cards 150a, 150b, 150c, 150n, each of the plurality of set-top boxes 250a, 250b, 250c, 250n acts as a selector/tuner for a desired channel. However, unlike each of the plurality of set-top box cards 150a, 150b, 150c, 150n, each of the plurality of set-top boxes 250a, 250b, 250c, 250n is illustrated as being located external to the computer system (not separately referenced).

Current Technology Recording Media

The current generation of computer hard disks, such as the Seagate Elite 47, scheduled for first quarter 1998 commercial availability, provides 47 GB of storage in one 5½ inch form factor disk drive. Disk storage density has been increasing by 60% per year for the last several years and is, according to a report published by IBM in December 1997, expected to continue to increase by 60% per year for at least the next ten years. This increase in disk capacity would mean a drive holding 47 GB today would hold (47*109) or 5,123 GB in ten years. At the current compression rate of MPEG II video, 1 GB per hour of video, 5,123 GB would store approximately 5,123 hours of compressed video on one drive. This is equivalent to recording 213 channels for 24 hours on one drive.

Compression Techniques

With MPEG compression, which can give compression yields in the 30–100 to 1 ratio, it takes about 1 billion bytes (1 gigabyte or GB) to store 1 hour of video. Other compression techniques, such as wavelets, can compress at rates up to 300 to 1, but are generally not as effective as MPEG because the MPEG compression technology was specifically designed for television video signals.

Work is ongoing on MPEG IV standards further to improve image quality and compression ratios. This invention does not depend on a specific compression technology (or compression whatsoever) as long as it produces a digital data stream that can be reconverted somehow back into a suitable video picture.

The User Interface

In the following, it is assumed that the DVR has the basic video recorder interface found on traditional VCRs well known to the users and people skilled in the art. Among others, these buttons are "play," "stop," "fast forward" and "rewind." One skilled in the art will appreciate that, within the context of the disclosed technology, some of these functions take on an enhanced capability, because the DVR can "rewind" several hours of video instantly. The functionality described below needs to be interpreted as working in conjunction and/or partially or totally replacing these controls.

Figure 9:
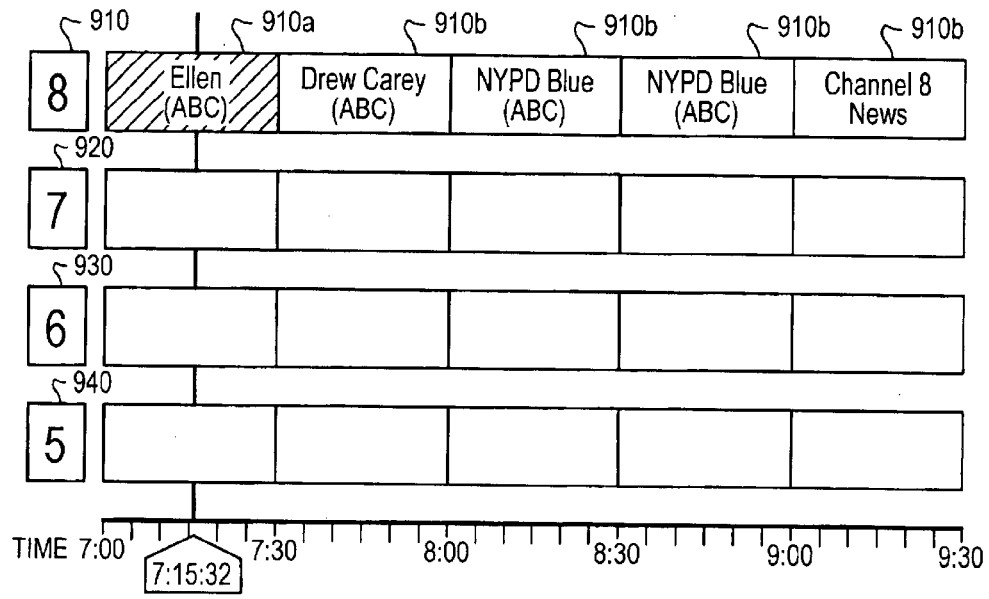
FIG. 9 illustrates a block diagram of an exemplary method for time block program selection in real time.

Assuming selected channels (or all channels) are automatically recorded, what is needed is a way to access the recorded material for viewing. For regular, real-time, viewing, a number of commercially-available television guides that are sent over the same medium as the channels or that can be downloaded from the Internet or from diskette already exist. The guides broadcast by satellite television suppliers usually present a time-channel matrix where the time is blocked in broadcast units e.g., ½ hour. This is illustrated in FIG. 9. With additional reference to the plan view of an exemplary channel and time surf button cluster 1400 of FIG. 14, the user can browse through the programs by hitting "▼" (up) or "v" (down) buttons 1420, 1440 to change the channel and ">" (forward) or "<" (backward) buttons 1430, 1450 to move in time units. (FIG. 14 also illustrates an "enter" or "go" button 1410 for concluding commands or answering queries.)

When used in regular satellite television viewing, the time unit containing the current time is displayed as the leftmost matrix column (this is not essential, just logical). Whenever the user selects the menu option, the program cursor is positioned into the leftmost column. Pressing the "go" or "enter" button switches the user to the channel on which the cursor is positioned, provided the current time is within the selected block.

Turning now to FIG. 9, illustrated is a block diagram of an exemplary method for time block program selection in real time. Separate channels 910, 920, 930, 940 are each comprised of program blocks. For illustrative purposes, channel 8 (the channel 910) is divided into program blocks 910a, 910b, 910c, 910d, 910e.

Figure 14:
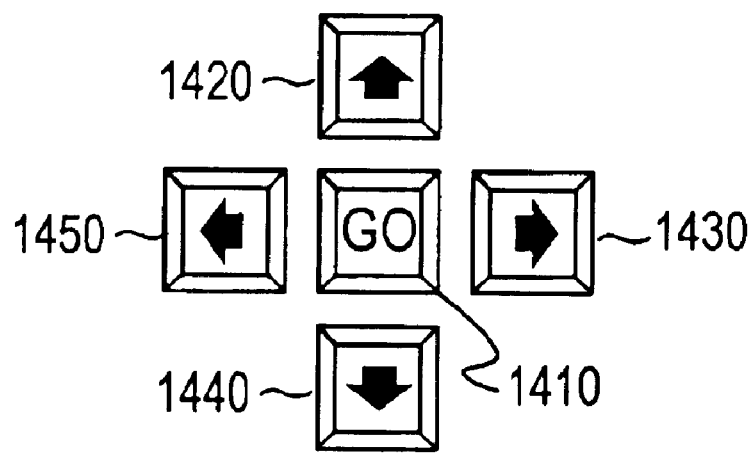
FIG. 14 illustrates a plan view of an exemplary channel and time surf button cluster.

In FIG. 9 the first program block 910a, marked "Ellen (ABC)", is the first block the cursor can be positioned on for channel 8, given the current time of 7:15:32 p.m. [.] ">" or "<" buttons 1430, 1450 of the representative button cluster of FIG. 14 can be used to see what is going to be broadcast in the near future (usually 24 hours ahead of time) on every channel.

The preferred embodiments of the current invention extends the use of this paradigm significantly by allowing, among other things: (1) surfing back in time (on recorded channels), (2) catch-up viewing (including intelligent commercial skipping), (3) auto-generation of a table of contents of the recorded subset of the broadcast past, (4) using the block and channel browsing paradigm described above for recording instructions, (5) a new method for program selection.

Surfing Back in Time and Catch-up Viewing

Whenever a channel has been marked for recording, the guide information is used by the system to allow backward scrolling through the program blocks introduced above. If channel 8 were marked for recording prior to 7:30:00 p.m., then the system would allow the cursor to be moved to the block marked Ellen (ABC), even when the current time is later then 7:30:00 p.m. [.] This is illustrated in FIG. 10.

Figure 10:
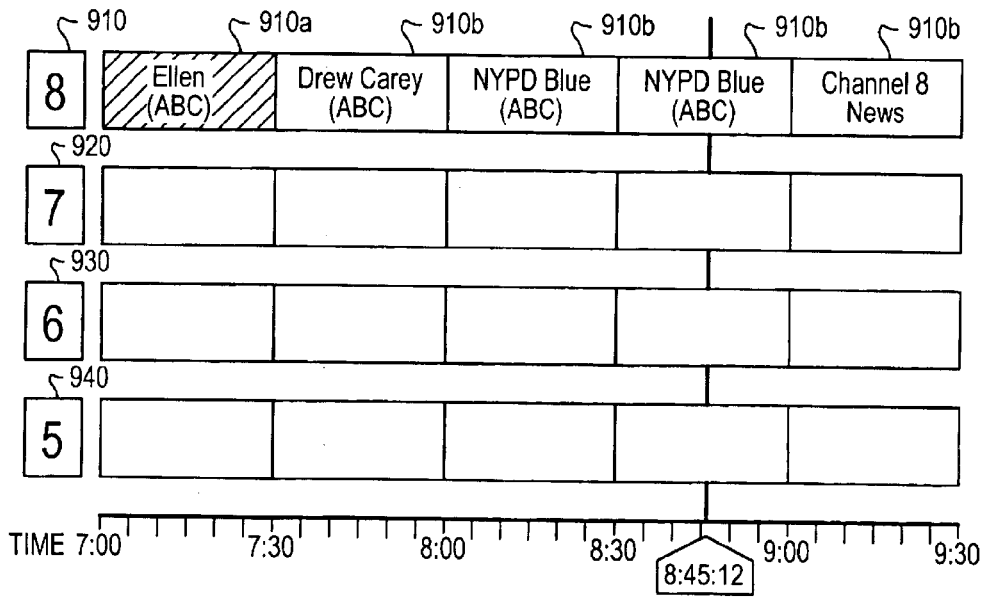
FIG. 10 illustrates a block diagram of an exemplary method for time block program selection and time surfing.

Like FIG. 9, FIG. 10 illustrates a block diagram of an exemplary method for time block program selection in real time. Separate channels 910, 920, 930, 940 are each comprised of program blocks. For illustrative purposes, channel 8 (the channel 910) is divided into program blocks 910*a*, 910*b*, 910*c*, 910*d*, 910*e*. By broadening the concept of the channel/time block concept, the user can use the same search paradigm for recorded as well as regular real time programming.

Figure 12:
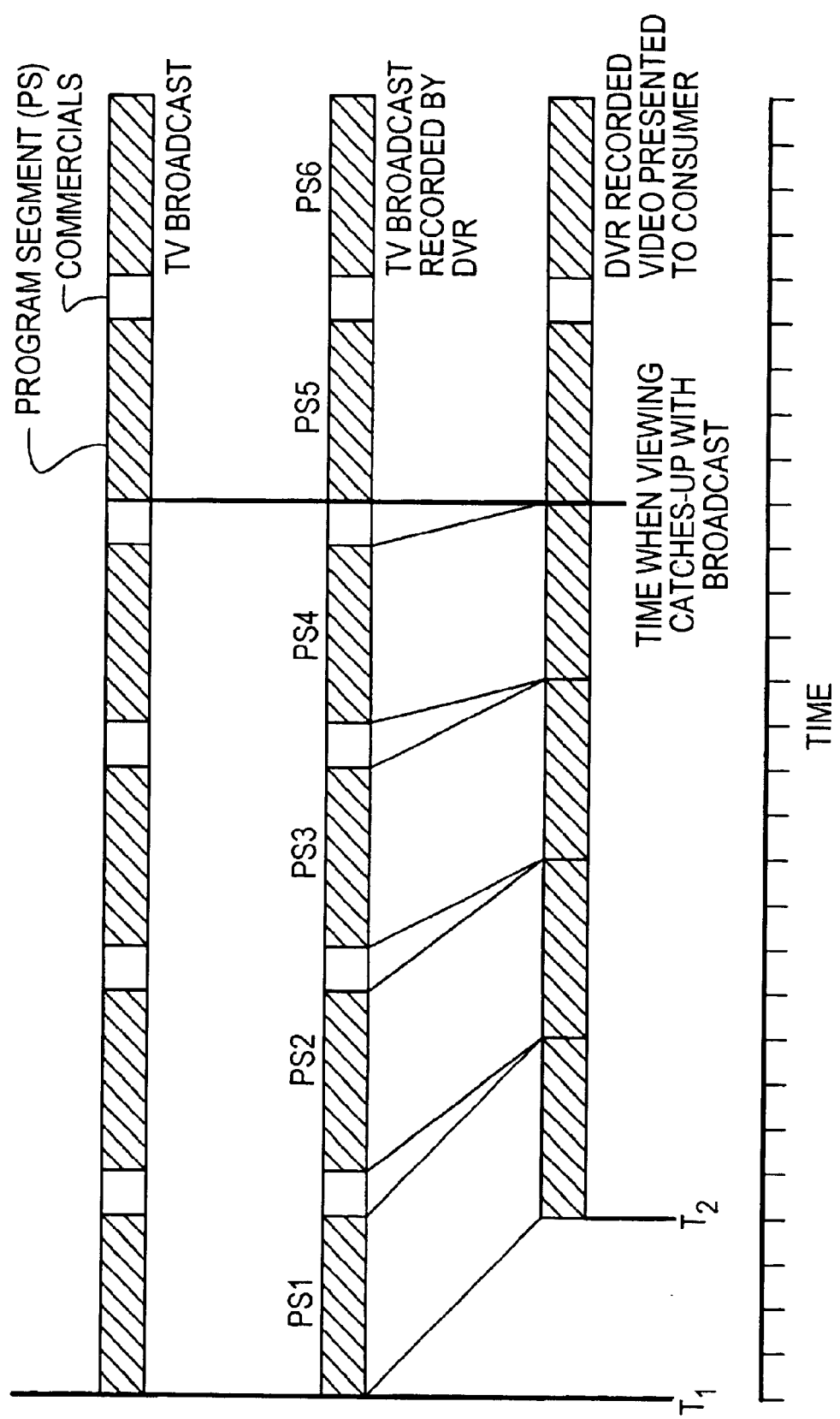
FIG. 12 illustrates a highly schematic diagram showing the concept of catch-up viewing.

Turning now to FIG. 12, illustrated is a highly schematic diagram showing the concept of catch-up viewing. This feature of the invention can be used when the user approaches the television at a point in time when the broadcasting of the program has already started, but not necessarily finished. Assume that the broadcasting of the program the user decides to watch has started at some time $t_1$. The DVR is recording this channel. The user wants to start watching the program at time $t_2$. The user time-surfs back using the method described below and indicates to the DVR that he wants to start watching the program. The DVR starts playback of program section 1 (PS1), after completion of this, the user hits the "skip commercial" button which moves the DVR to'the beginning of program section 2 (PS2) and so on. Depending on the amount of time between $t_1$ and $t_2$ the user's viewing "catches-up" with the real-time recording of the program being broadcast. The only way the user would be able to tell that he was no longer watching the recorded copy is that the "skip commercial" or "fast-forward" buttons no longer have their usual effect.

This "catching-up" feature of the present invention can be used when the user approaches the -television at a point in time when the broadcasting of the program has already started, but not necessarily finished. The DVR (100 of FIG. 1) is recording the channel on which the program is broadcast. The user wants to start watching the program from the beginning. Therefore, the user time-surfs back using the method described above, and indicates to the DVR that he wants to start watching the program. The DVR starts playback of program section 1 (PS1), after completion of this, the user hits the "skip commercial" button which moves the DVR to the beginning of program section 2 (PS2) and so on. Since the DVR has no real way of determining when commercials start and stop, the present invention includes a method to efficiently use the information stored to give the user a rapid commercial skip function.

Commercial Skipping

Commercials aired during most television broadcasts last for a time that is usually (although not always predictably) a multiple of the base television commercial time unit (CTU), e.g., 15 seconds. During regular shows the multiplication factor is usually 8, giving a total of 2 minutes for one commercial break. With about 4 breaks in a half-hour prime time broadcast block, this it computes to about 20 to 22 minutes of actual programming, consistent with observation. Some commercial spots last for one CTU, most for 2 CTUs, and some longer.

Figure 11:
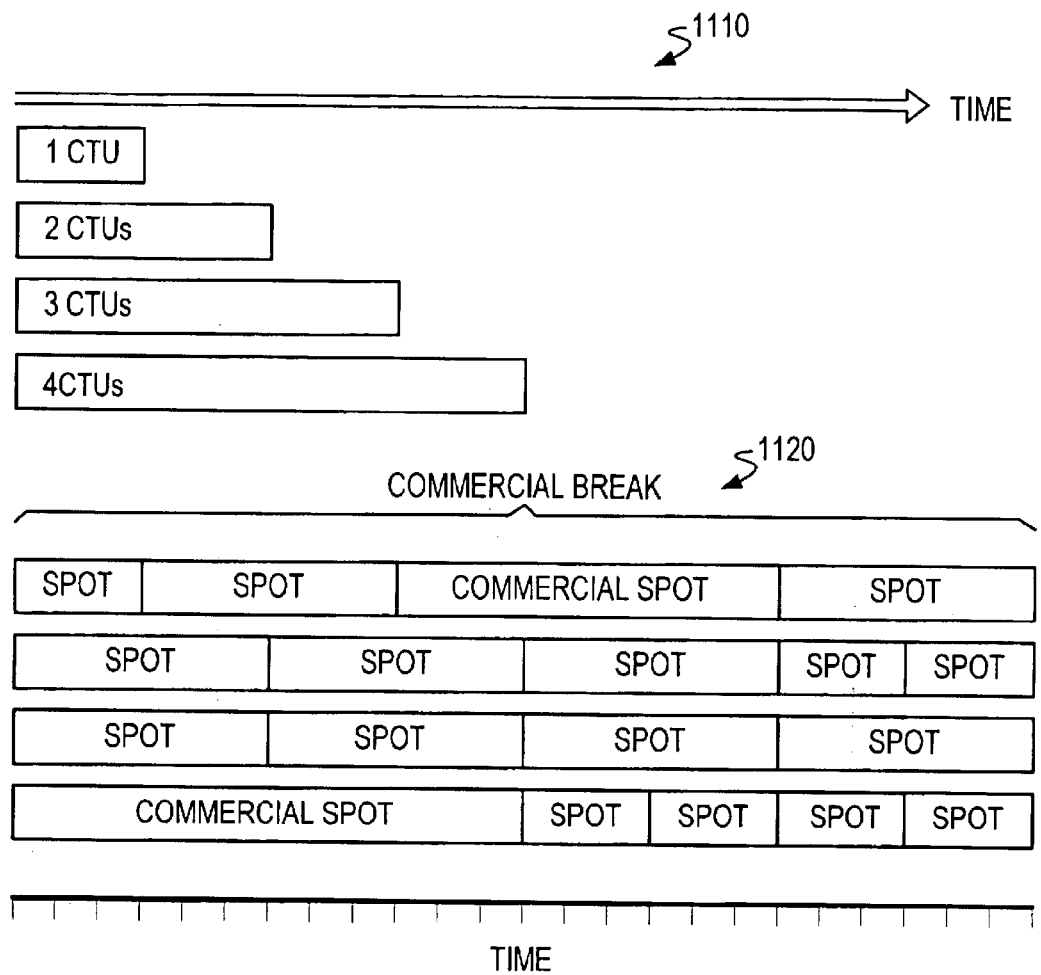
FIG. 11 illustrates a highly schematic diagram showing the related concepts of commercial time units and commercial breaks.

Turning now to FIG. 11, illustrated are commercial spots 1110 of lengths varying between 15 seconds (1 CTU) and one minute (4 CTUs). FIG. 11 also illustrates how a given commercial break 1120 lasting, for example, two minutes, may be broken up into commercial spots lasting varying numbers of CTUs.

When viewing recorded video, either where the actual broadcast has already completed or the program is still in progress, the user may wish to skip individual commercials, or the entire commercial break altogether. To support this feature, the present invention includes a method to take advantage of the recording techniques described later.

Figure 13:
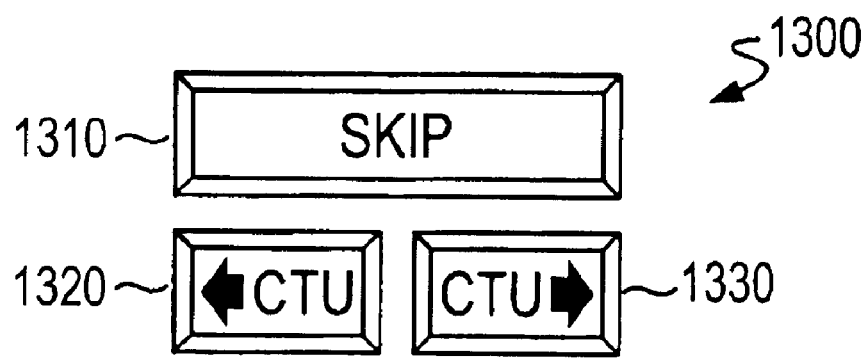
FIG. 13 illustrates a plan view of exemplary "skip commercials" control button cluster.

Turning now to FIG. 13, illustrated is a plan view of exemplary "skip commercials" control button cluster 1300. The button cluster 1300 comprises a "skip commercial" button 1310, a "CTU <" (CTU back) button 1320 and a "CTU >" (CTU forward) button 1330.

Suppose the user notices the start of a commercial break. To skip the entire break, he hits the "skip commercial" button 1310. The DVR then computes the new offset for viewing by multiplying the number of CTUs in a break (default is 8) and multiply that by the number of seconds in a CTU (default is 15), giving 120 seconds, and restart the viewing process. If the user notices (and cares) that the video he is viewing is either still inside the break or already too far into the actual programming, a few options are available.

Assuming the DVR skipped too far (into the program), the user can now hit the "CTU <" button 1320 to move the DVR back one CTU. If this results in the right spot, the user can continue watching the programming. If not, the user can (1) hit the DVR's ">" button (1430 of FIG. 14) to move forward one time unit (second) until the desired spot is reached or (2) hit the "CTU <" button 1320 again. This moves the DVR back the number of CTUs in a break minus one, putting the DVR at the initial time the user decided to skip, plus one CTU. Hitting the "CTU >" button 1330 again moves the DVR one CTU forward.

Assuming the DVR did not skip far enough (still in commercial), the user can hit the "CTU>" button 1330, moving the DVR one CTU forward Fine-tuning can be done using the DVR's ">" and "<" (back) buttons for one-second movement back and forward.

The CTU length and the default number of CTUs per commercial break are configurable by the user. When viewing a program in real time (as it is being broadcast) even while it is being recorded, the skip commercial, the "CTU >" and "CTU <" buttons 1330, 1320 become inoperable when time of viewing is equal to time of broadcasting.

The above features, combined with the recording technology described below, allow for the commercial free viewing of recorded material and catch-up viewing as explained earlier.

Table of Contents

There are already a number of television guides that are sent over the same medium as the channels, or that can be downloaded from the Internet or from storage media. These guides contain program information for a given period for all channels. This information can be browsed to find the programs of choice, or for keywords to find, e.g., programs with Clark Gable as an actor or programs in which the subject matter is the creation of the universe. Using this information, the illustrated embodiment maintains a content file for every time unit for-ever channel recorded, thereby creating a subset of the original guide. This table can then be browsed to find the program of interest in the recorded video data.

Recording Instructions

Recording instructions are communicated to the DVR using the it same interface as for channel and time surfing. The default is that whenever a channel is selected for recording (by positioning the cursor on the channel line in FIG. 9 and hitting the record button) the DVR starts recording that channel for 24 hours. After that the DVR reuses the space for that channel, in other words, 24 hours of this channel are available for time surfing. A load indicator informs the user of the space used by this operation versus the total available (not used yet) space. The user has the option to release space by deselecting a channel for recording. This has the effect that the new channel starts overwriting the old (released) channel information when this operation is executed, and, after 24 hours the information for the new channel has completely replaced the old channel.

Archive

Once channels are being recorded certain parts (of programs) can be marked for archiving, using the archive button. This causes the DVR to create a single channel file on an optional removable recording medium so that the information does not get overwritten when the next 24 hours of information is stored. The DVR supports a virtual channel in addition to the broadcast channels available to replay these kind of archived programs. The same channel can be used to replay devices such as DVDs, mimicking the traditional VCR rent cassette paradigm.

Computerized Content Search

The DVR as disclosed here also provides the capability to do content search by automatically cataloging the audio content digitally. This process can proceed as follows: (1) using the audio portion of the broadcast signal and feeding it into an optional speech recognition capability (well known to those familiar with computing devices), or using the already text translated closed-caption signal if available and (2) the resulting text of the audio is then indexed into a full-text database. This database provides an index linking each (or a subset of) word to the channel file and time recorded.

When the user then wants to search for a certain content, the user is presented with a text search engine (similar to the now well established World Wide Web search engines). After entering the sought after words or phrase, the DVR then presents the user with a prioritized list of programming blocks (channel and time unit) from which the user can then pick what he or she wants to view.

Recording Techniques for the DVR Single Channel File Approach

One approach to concurrently storing, on a computer disk, a is, plurality of channels is to store each channel in a separate file. This technique limits the number of channels that can be recorded concurrently, because the disk arm must be moved from the position of one file to the position of the next file to write the data for each channel. This round robin movement happens as follows first seek the end of the first channel's file and write the first channel's digital data, then seek the end of the next channel's file, write the next channel's digital data, and so on, until all channels are written. Depending on the speed with which this can be accomplished, and the amount of buffering that can economically be done, this may not be an acceptable implementation.

The following analysis is directed to the feasibility of this approach:

Assume that recording an MPEG II compressed video channel requires ½ megabytes (MB) per second.

Recording 20 channels concurrently therefore requires. 10 MB per second.

Today's hard disks' worst case sustained throughput is about 10 MB per second.

The average seek time of today's disks is about 12 milliseconds and the average rotational latency about 6 milliseconds, for a total average seek time of roughly 18 milliseconds.

Buffering the channels in main; memory and writing each channel to disk in a round-robin fashion requires 10 MB per second.

Using no more than 40 MB of main memory to store the buffers, one would need to write all buffers to disk at least once every four seconds. To write 20 buffers to 20 different files every four seconds requires 20 disk seeks, or (20/4) 5 disk seeks per second.

For retrieval purposes, an index needs to be written. This could double the number of files and the disk seeks to 10 times a second.

Modern operating systems, such as Microsoft® Windows™ 95 keep file allocation tables (FATs) to access files. With this number of files open concurrently, the operating system gains access to its FATs to accomplish the file updates, possibly doubling the disk seeks again to 20 per second.

At an average case total seek time of 18 milliseconds, 20 seeks per second would require an average of 360 milliseconds out of every second of video recorded, consuming over one-third of the disk's throughput.

Even if one assumes the directories and FATs are cached in main memory and that the index information is cached in main memory, lots of disk seeks limits the number of channels that can be concurrently stored.

One way to reduce the effect of disk seeks is to use multiple disks, such as provided by redundant arrays of independent disks (RAID) storage, and write each channel to a separate disk. To record say, 20 channels with a minimum of disk seeks; one would need 20 disks, which would be expensive. If indeed RAID systems become inexpensive and fast enough, then a system to record a plurality of channels using a one file per channel approach becomes feasible.

Figure 3:
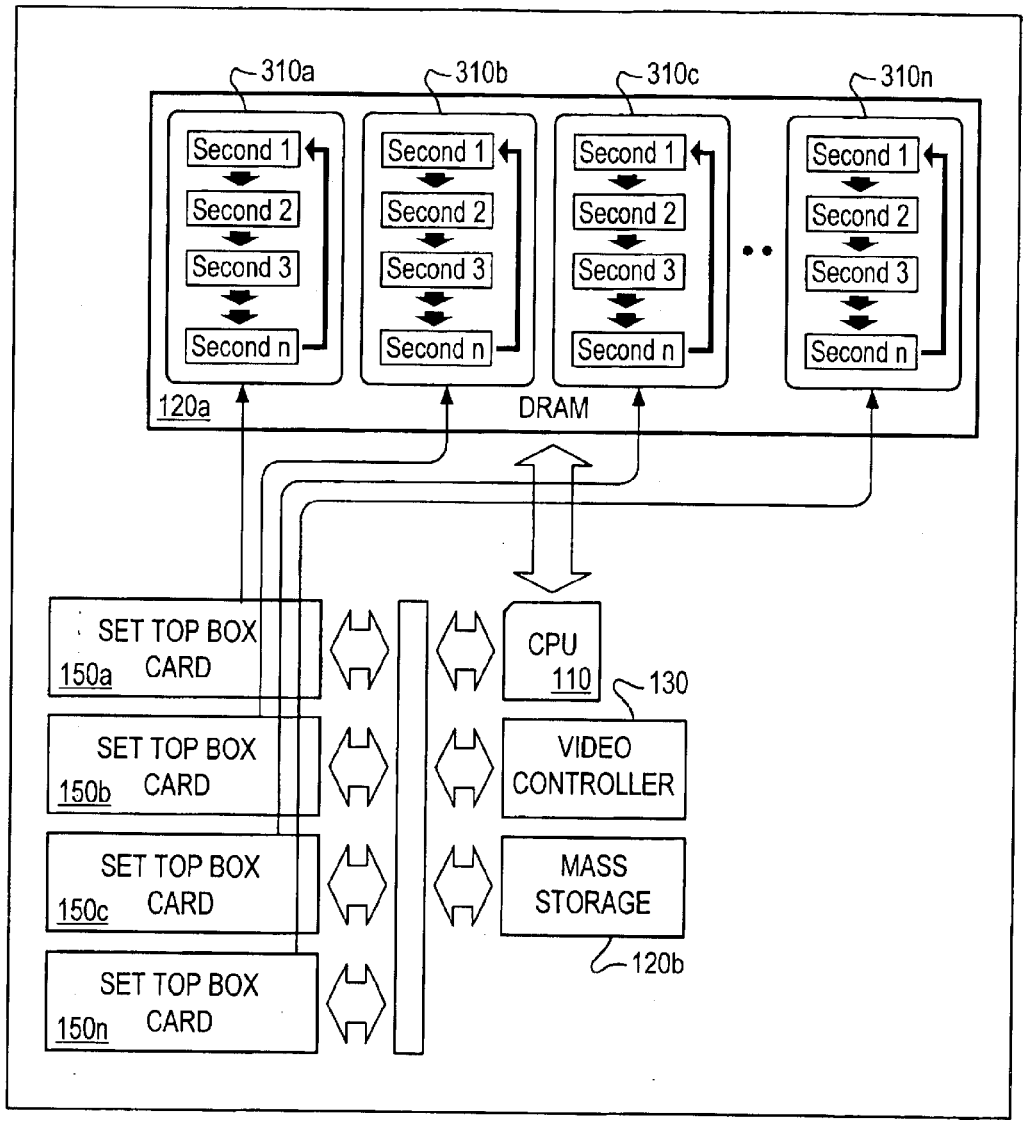
FIG. 3 illustrates a block diagram of exemplary circular FIFO buffers in memory for each recorded channel.

Turning now to FIG. 3, illustrated is a block diagram of exemplary circular FIFO buffers in memory (the DRAM 120a of FIG. 1) for each recorded channel. The buffers, designated 310a, 310b . . . 310n contain portions of streams of video data corresponding to separate channels. The buffers 310a, 310b . . . 310n may be divided into seconds, as shown.

As shown in FIG. 3, the compressed video data from each channel, produced by the set-top box card for that channel, is first written (buffered) in main memory (DRAM 120a) buffers. Then, the data is read from the DRAM 120a and written to the mass storage unit 120b. One method to cache the data is to write one main memory circular FIFO buffer for each channel, using a linked list directory concept.

Figure 4:
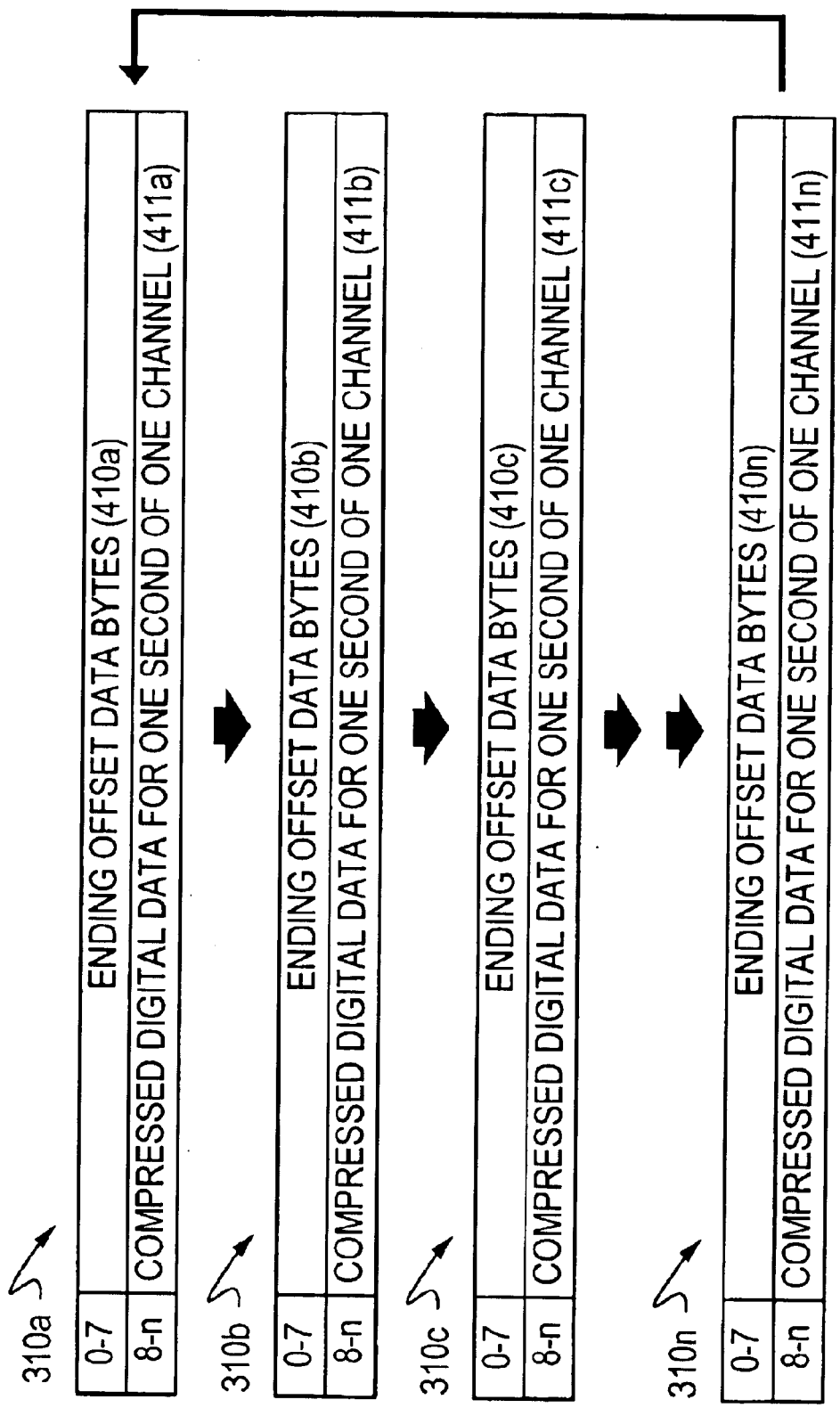
FIG. 4 illustrates a block diagram of a portion of an exemplary circular FIFO buffer illustrated in FIG. 3.

Turning now to FIG. 4, illustrated is a block diagram of the exemplary buffers 310a, 310b . . . 310n illustrated in FIG. 3. The buffers 310a, 310b . . . 310n are shown as containing ending byte fields 410a, 410b . . . 410n and corresponding compressed portions of a digital video data stream 411a, 411b . . . 411n.

Using a circular FIFO buffer means that some maximum size for each buffer has to be set, e.g., two megabytes. As data are written to the buffers, when the end of the buffer is reached, the beginning of the buffer is overwritten. "FIFO" means that the data in the buffers is read in the sequence it is generated, i.e., the older data are read from the buffer and written to disk before newer data are read from the buffer and written, to disk. Each channel has its own circular FIFO buffer. This is a technique well known to persons skilled in the art. The next step is to write the bytes for that time unit to a disk file. Each channel has its own disk file, which, for purposes of the present discussion, can be termed a "single channel file."

To write channel 9's data to disk, one would first read channel 9's FIFO buffer, reading the first 8 bytes for the time unit one wishes to write. The first 8 bytes contain the ending offset, the last byte for channel 9 for that time unit. Subtracting the number read from the current offset produces n, the number of bytes used to store this time unit's data. One then reads the next n bytes and writes those bytes to disk in the channel 9 single channel file. Writing the remaining channels, one continues (usually in a round-robin fashion) by reading the same second from the next channel's FIFO buffer, and writing it to the next channel single channel file, until all channels are processed. After that, one reads the next 8 bytes in the first channel's buffer, which is the ending offset for the next time unit.

To have a consistent and unique file name for all of the single channel files, and to provide for a way to store these recordings off-line, the following exemplary file naming convention is proposed. Assume the operating system used provides the classic XXXXXXXX.EEE (8.3) naming convention, where XXXXXXXX is the 8 byte name of a file, and EEE is the 3 byte file extension. The method proposed here encodes (in base 36) the Julian date (four bytes) concatenated with a sequence number (four bytes) indicating the number of files recorded during a given day (in base 36), and a file extension equal to the channel-sequence number in base 36. Julian dates are defined as the number of days since January 1 of the year 0 AD. Using this method, the name of the first file written for channel 9 for Jan. 1, 1998, would be:

Jan 1, 1998, translated to Julian date would be 1998*365 or 729,270 plus a day for each leap year, giving a total of 729,770.

This 6 digit number is stored in the first 4 bytes of the file name by using a base 36 notation, using only 36 characters out of the standard 256 character ASCII set, specifically the uppercase letters "A" through "Z" and the numerals "0" to "9". This method avoids conflicts with operating systems having restrictions in certain computer operating systems over the allowable characters in a file name (such as the period and lower case letters) Using the base 36 notation up to 1,679,615 days (36 to the $4^{th}$ power −1) can be stored in the first four bytes of the file name instead of 9,999 days (10 to the $4^{th}$ power −1) using just the digits 0–9.

Jan 1, 1998, encodes to FN3E (15 23 3 14).

The first file means the four bytes for the file sequence are 0001.

The file extension is 009 for channel 9, yielding the file name <FN3E0001.009>

Figure 5:
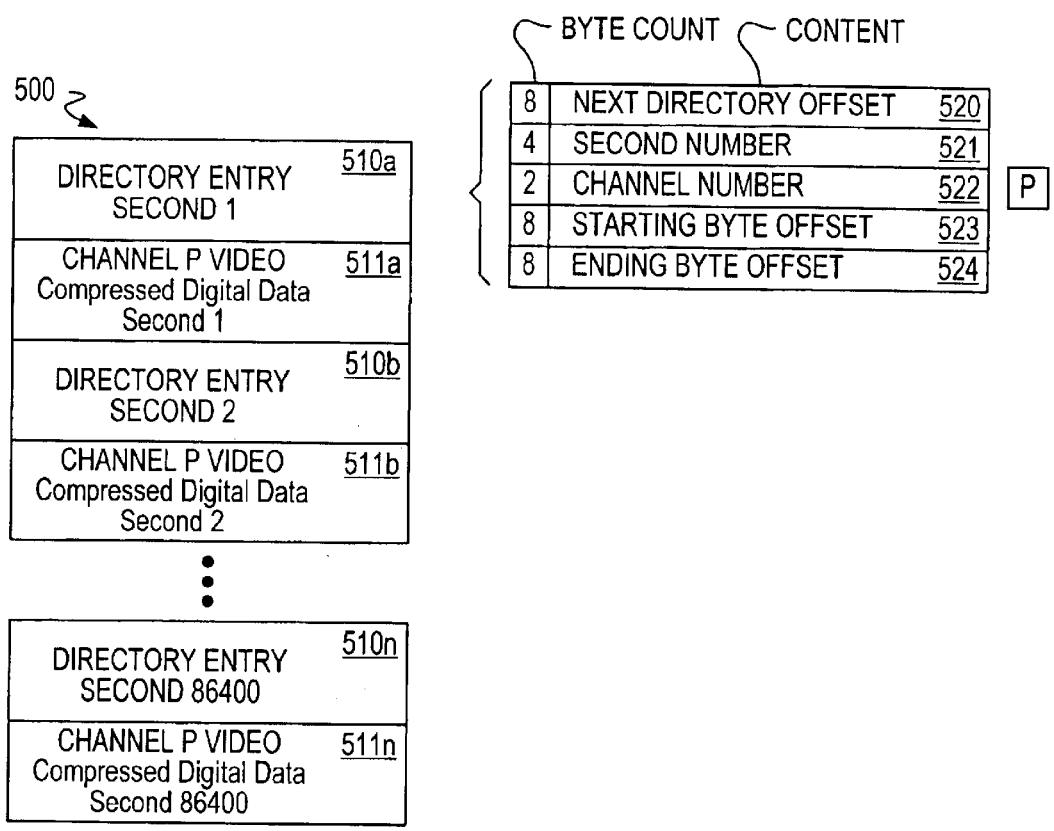
FIG. 5 illustrates a block diagram of an exemplary data and directory structure for a single channel file.

Turning now to FIG. 5, illustrated is a block diagram of an exemplary data and directory structure, generally designated 500, for a single channel file. The directory structure 500 includes directory entries 510*a*, 510*b* . . . 510*n* on and corresponding compressed portions of a digital video data stream 511*a*, 511*b* . . . 511*n*. One directory entry 510*a* is expanded to show "next directory offset," "second number," "channel number," "starting byte offset" and "ending byte offset" fields 520, 521, 522, 523, 524.

As shown in FIG. 5, for the block of bytes written for each time unit, a directory entry (for example, the directory entry 510*a*) is written at the beginning of the block for that time unit. The directory contains the time unit sequence number (illustrated as having a maximum value of 86,400), the byte offset of the directory entry for the next time unit, and the offset for the first and last byte for the data written for that channel for that unit.

The directory entry is used to allow rapid access to data for that channel. When replaying the channel, one first reads the directory entry for the time unit of interest. This yields the first and last byte for that unit, then the data (video) bytes, then the directory for the next second, etc. The time unit sequence number is maintained in the directory so that, while viewing a particular channel and later surfing, one can know the current time unit to which to switch in the new channel data.

Since this method is not specifically designed to minimize the number of disk seeks to support the desired functionality, and to increase the number of channels that can be concurrently recorded; the present invention introduces a new concept: time division multiplexing of data in a disk file.

Therefore, in addition to disclosing a method of storing each channel to a separate file, the present invention discloses a method which overcomes these limitations by writing all, channels to one disk file, an approach that may be termed "disk file time division multiplexing."

Disk File Time Division Multiplexing (DFTDM)

Retrieving data from a recorded digital data stream where the number of bits/second of video is constant, such as for non-compressed data streams, non-compressed video, can be done using the well known technique of hashing (address translation). This technique is used to seek to the proper byte offset in a disk file to retrieve the bytes recorded at a given time. For example, to find one second of video recorded 5 minutes (300 seconds) after the start of the recording, one would seek a byte offset equal to the time elapsed (300 seconds) multiplied by the video rate (e.g., 10 MB/sec). Reading the next 10 MB would give the next second of video recorded.

Compressed digital data streams, such as MPEG II however, do not use a fixed number of bytes to represent each second of viewing. One-half MB may be required to represent a second of fast moving video, such as a car chase, while only one tenth of that may be required to represent one second of a slow moving scene, such as the night sky. Therefore, direct hashing (key to address) cannot be used.

The approach described below provides for the rapid retrieval of variable data rate digital data, such as MPEG II compressed video. It also provides synchronization of the data streams, to allow rapid switching from one channel at a given time to another channel at a different time. This feature is advantageous in supporting channel surfing in the past (recorded video).

In DFTDM, instead of writing each channel to a separate file, all channels are written to the same file, called a "combined channel file." As shown symbolically in FIG. 3, the data stream for each channel is buffered in a FIFO buffer in main memory. In FIG. 3, the depth of the buffer is 4 seconds worth of recording. As can be readily determined from the above discussion, the FIFO buffers are not of fixed length. This fact is illustrated in FIG. 5 detailing the structure of the buffers.

Figure 6:
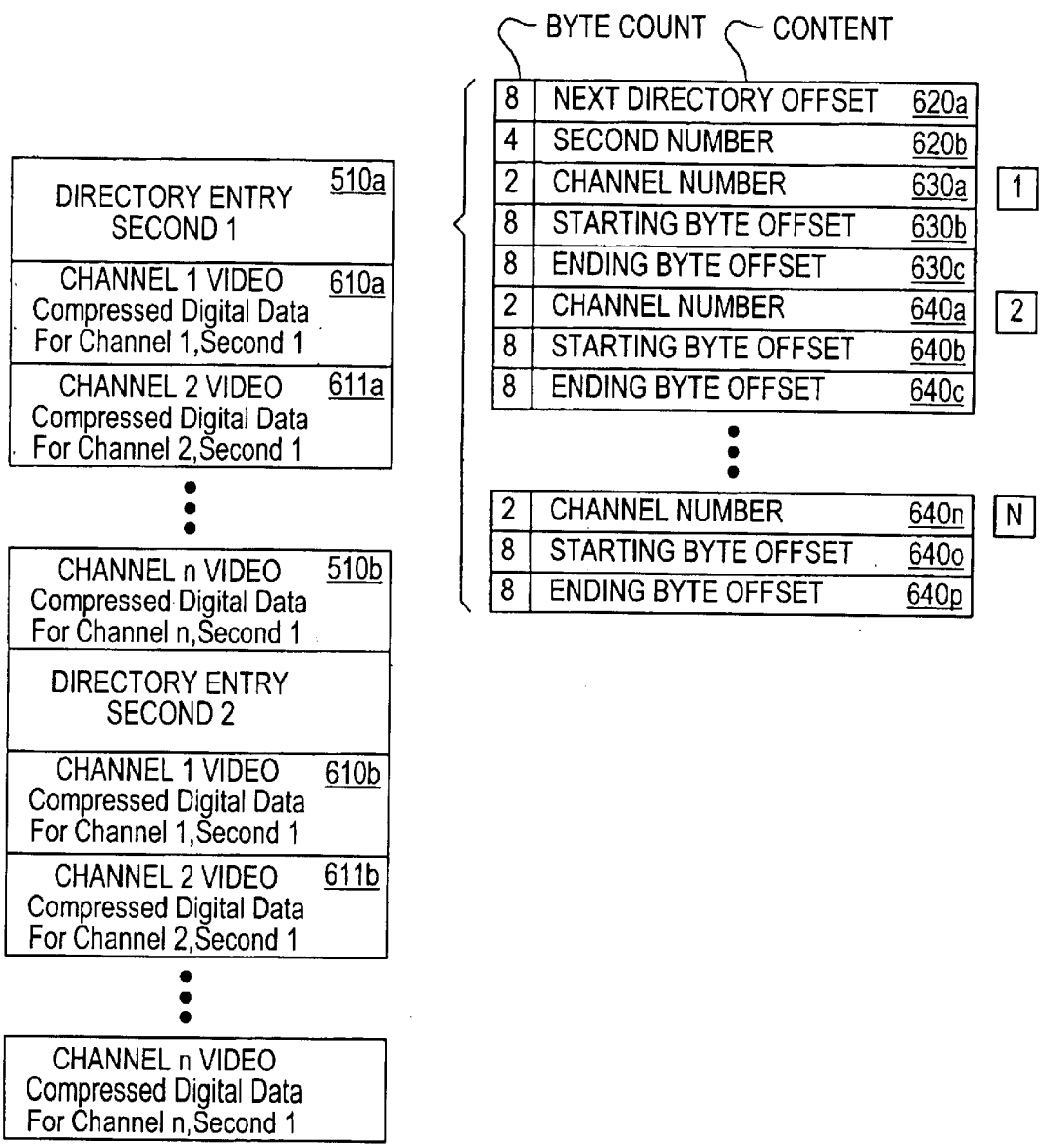
FIG. 6 illustrates a block diagram of an exemplary data and directory structure for a combined channel file.

Turning now to FIG. 6, illustrated is a block diagram of an exemplary data and directory structure for a combined channel file. The directory structure contains directory entries 510*a*, 510*b* and corresponding compressed portions of a digital video data stream 610*a*, 611*a*, 610*b*, 611*b*. One directory entry 510*a* is expanded to show "next directory offset," "second number," "first channel number," "starting byte offset," "ending byte offset," "second channel number," "starting byte offset," "ending byte offset," "nth channel number," "starting byte offset" and "ending byte offset," fields 620*a*, 620*b*, 630*a*, 630*b*, 630*c*, 640*a*, 640*b*, 640*c*, 640*n*, 640*o*, 640*p*.

As shown in FIG. 6, one continuously writes, to the combined channel file and in a round-robin fashion, the buffer for the first channel, then the buffer for the second channel then the buffer for the next channel, etc., until the buffer for the first channel is reached.

When the combined channel disk file reaches a predetermined size, e.g., 4 GB, one starts writing to the next disk file. For example, assuming 1.0 GB per channel per hour for MPEG II compressed video, and assuming 10 channels are stored concurrently, then a 4 GB file would store 4/10 hour (24 minutes) of the 10 channels.

As shown in FIG. 6, for the total block of bytes written for each time unit (e.g., a second), a directory entry of channel offsets is written at the beginning of the block of bytes for every recorded time unit. The directory contains the sequence number of the time unit, the byte offset for the directory entry for the next time unit, and, for each channel, the offset for the first and last byte for the compressed data written for each channel for that time unit. The directory entry is used to allow rapid access to the bytes written for any particular channel. When viewing (reading from the disk and presenting the video to the user) a channel, the DVR reads the directory entry for a particular time unit. The entry produces the first byte and last bytes (within that block of bytes), for that channel. The DVR then reads but discards the bytes read (skipping the fist and last bytes for the time units for the channels not being displayed) until the first byte for that channel is reached. The DVR then reads the data (video) bytes, displaying the content to the user, at the end of the time unit's data, it reads the directory entry for the next time unit, etc.

Channel surfing, as it is known today happens in real-time. The user views each channel in real time, in other words as the signal is broadcast. When viewing channel 9 at 16:43:16 till 16:43:45, and then switching (surfing) to the next channel, e.g., channel 15, the user would pick the programming on the new channel a second (or a fraction of a second) later, i.e., 16:43:46 on channel 15. To simulate this real-time viewing during time surfing on the DVR, the DVR reads from the combined channel file in a sequential manner.

While the user is watching the programming from channel 9 during this period being viewed, the following happens:
(1) the DVR seeks to the proper channel-time offset in the combined channel file, and reads the directory entry to find the beginning and ending byte offset for channel 9 for that second, as well as the offset of the directory entry for the next second,
(2) the DVR then reads the block of bytes for channel 9 for that second and provides these bytes to the television for viewing (for compressed video, the output is first sent to the decompression device or software, e.g., the MPEG II decoder) and
(3) then, without seeking, the DVR reads the directory entry for the next second, and provides the channel data for the next second.

The naming convention for the combined channel file(s) is comprised of the 4 byte Julian date encoded in base 36, followed by a 4-byte sequence number also in base 36, with .COMA as an extension.

The sequence number as part of the file name is used because of file size limitations imposed by different computer operating systems, and to allow for more than one disk to be used if so desired. Using the same base 36 notation described above allows up to 1,679,615 combined channel files on a given date, using just the 8-byte file name.

Figure 7:
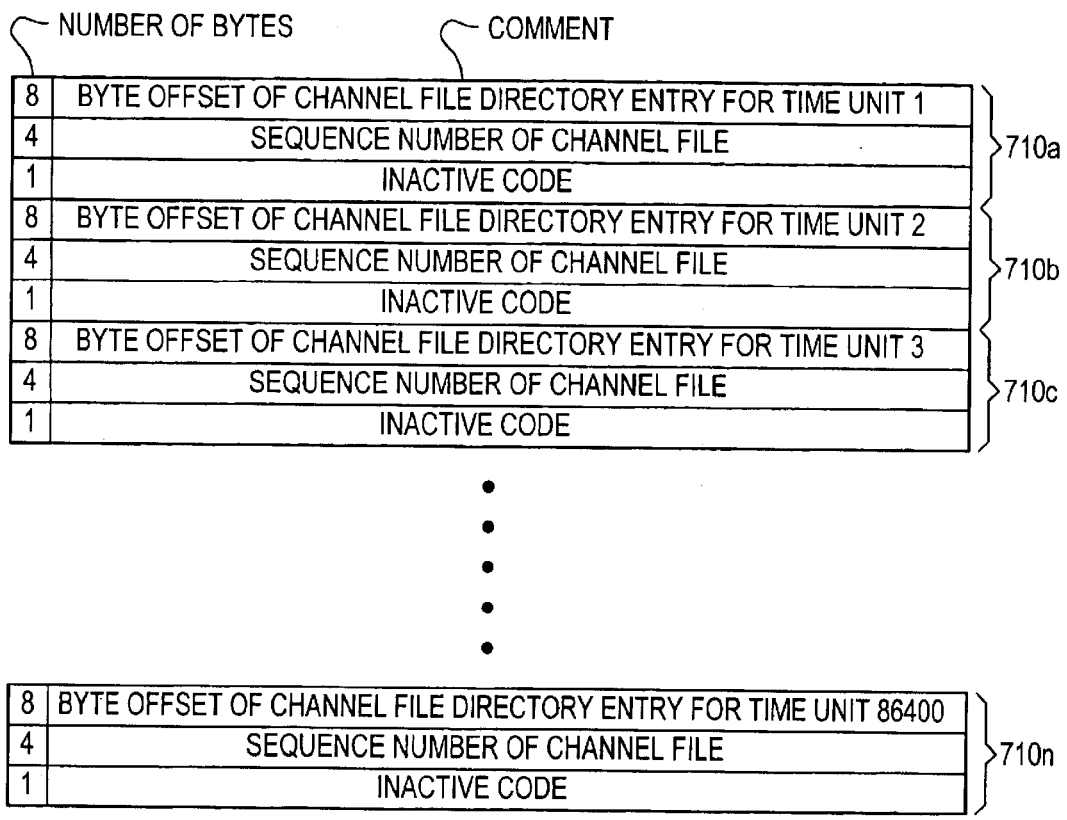
FIG. 7 illustrates a block diagram of an exemplary data structure for an address translation file (ATF)

Turning now to FIG. 7, illustrated is a block diagram of an exemplary data structure for an address translation file (ATF). The ATF is illustrated as including byte offsets and sequence and inactive codes corresponding to first, second and nth channels (710a, 710b, 710n). ATFs are used to facilitate maintaining information about which channels were recorded when.

As shown in FIG. 7, the ATF contains a 13-byte entry for each time unit (second) in the day, 3600 seconds/hour multiplied by 24 hours or 86,400 13-byte entries, or 1,123, 200 bytes. When a channel is being recorded for a given time unit during the day, an entry is made into the ATF. The first eight bytes of the entry are the byte offset for the directory entry for that unit in the single channel file or combined channel file. The next 4 bytes of the entry are the sequence number of the single channel file or combined channel file. The last byte is an inactive code. This code indicates whether the record is inactive due to either (1) data was not written for that time unit (no channels have been recorded for that unit) or (2) the data for that unit (the channel file) has been deleted as part of the FIFO methodology to free disk space for current recording.

If each channel is written to a single channel file, there is one ATF per channel per day. If all channels are written to the same file (combined channel file) there is only one ATF for each day (as opposed to one ATF per channel per day). The ATF name is 7 bytes, in which the first 3 bytes are "ATF" and the last 4 bytes is the Julian date, in the base 36 notation described above. The extension part of the ATF is the channel number, if single channel files are being used, or "COMA" if combined channel files are being used.

For example, for Jan. 1, 1998, using a combined channel file, the ATF name for that day would be ATFFN3E.COM. If each channel is being written to a separate file, one ATF exists for each channel for the day, e.g., ATFFN3E.009 and ATFFN3E.202 for channels 9 and 202, respectively.

Thus, to view channel 9 at 6:10:43, the DVR goes through the following steps:
(1) calculate the number of seconds in the day, starting at midnight, giving (3600 seconds/hour* 6 hours+ (60 seconds/minutes* 10 minutes)+43 seconds)=22,243 seconds,
(2) multiply the number of seconds multiplied by 13 to get the byte offset of the entry for that second, since each entry in the ATF is 13 bytes and
(3) seek to that byte offset and read the 13-byte value. This tells one whether the record is active or inactive, the sequence number of the file (for more that one single channel file or combined file on a given day), and the offset of the directory for that second in the single channel file or combined channel file.

To minimize the number of disk seeks during recording, the ATF(s) can be maintained or cached in main memory. Also, the ATF(s) can be placed on a separate physical disk than the channel file, to minimize disk seeks.

Another limitation of the one file per channel (single channel) approach becomes apparent when viewing recorded video. If one views what was recorded from channel 2 at 6:10:43 and then surfs to channel 9, the DVR needs to instantly move to what was recorded from channel 9 at 6:10:43. If channel 9 data were in a separate file, the DVR would have to seek (move the disk drive head) to the correct position before reading the video data.

This invention is also designed to support channel surfing, in real time as well as from recorded video, as realistically as possible. When one channel surfs in real time, channels are viewed as they are broadcast, when viewing channel 9 from 16:43:16 to 16:43:45, then surfing to channel 15, the time would be 16:43:46. To simulate this real-time surfing from recorded video, the DVR reads from the combined channel file in a sequential manner. To play back what was on channel 9 during the initial period, the DVR does the following:

(1) hashes to 16:43:16 in the ATF and reads the 13-byte value, (2) seeks to that offset in the combined channel file and reads the directory entry to find the beginning and ending byte offset of channel 9 for that second and (3) reads the block of bytes for channel 9 for that second and provides these bytes to the television for viewing (for compressed video, the output is first to the decompression device or software, e.g., the MPEG decoder).

Then, when the user surfs (switches) to channel 15, the DVR:

(1) uses the (stored) next directory offset, skip to the next time unit directory entry, (2) finds the channel number (15) and the starting byte offset and (3) reads the block of bytes for channel 15 for the next second and provides these bytes to the television for viewing.

The user is now presented with what was broadcast on channel 15 immediately after what was broadcast on channel 9 just prior to the switching. From the user's perspective the behavior of the system is identical to real-time surfing.

Table of Contents Generation

Turning now to FIG. 8, illustrated is a block diagram of exemplary data structures for table of contents retrievals. Three tables of contents 810, 820, 830 are shown. Each table of contents 810, 820, 830 contains the same content data arranged into columns 810a, 810b, 810c, 810d, but the columns 810a, 810b, 810c, 810d are reordered and sorted according to the user's wishes to enhance useability.

From the information broadcast on some of the satellite services combined with the recorded channel versus time information, one can automatically construct a table of contents, illustrated in FIG. 8. Therefore, in addition to the channel and time surfing method discussed above to find programs to view, one can peruse an on-screen table of contents.

The date is given by the name of extant ATFs. The time is given by the ATF, which has one entry for each second of a day. The channels are given by the directory entries in the single channel file or combined channel file.

The default value for the title is blank. However, if a downloaded channel guide is available, the title from the channel guide is used for the title, and the description from the channel guide is also made part of the table-of-contents record. The table of contents can be viewed sorted in channel order, title order, or date/time order. For each program recorded, the title is shown, followed by the date and time, followed by the channel number.

From the above, it is apparent that the present invention provides a DVR and a method of operating the same. In one embodiment, the DVR includes: (1) a mass data storage unit that concurrently and continuously receives and digitally stores a plurality of channels and (2) a channel viewer, coupled to the mass data storage unit, that retrieves a portion of one of the plurality of channels from the mass data storage unit based on a received command and presents the portion on a video display device.

Although the present invention has been described in detail, those skilled in the art should understand that they can make various changes, substitutions and alterations herein without departing from the spirit and scope of the invention in its broadest form.

What is claimed is:

1. A digital video recorder (DVR) for recording a plurality of television broadcast programs, comprising:

a mass data storage unit that concurrently and continuously receives and digitally stores a plurality of television broadcast programs together with time information to allow said plurality of stored television broadcast programs to be synchronized with respect to one another; and a channel viewer, coupled to said mass storage unit, that retrieves a portion of one of said plurality of stored television broadcast programs from said mass data storage unit based on a received command and presents said portion on a video display device.

2. The DVR as recited in claim 1 wherein said mass data storage unit stores said plurality of channels on a first-in-first-out basis.

3. The DVR as recited in claim 1 wherein said mass data storage unit concurrently stores said plurality of channels in separate files based on channel and timeslot identification.

4. The DVR as recited in claim 1 wherein said mass data storage unit stores said plurality of channels concurrently in a combined channel file.

5. The DVR as recited in claim 1 wherein said channel viewer comprises a channel guide database containing pointers to locations in said mass data storage unit.

6. The DVR as recited in claim 1 wherein said channel viewer displays a channel guide on said video display device, said channel guide providing information regarding a content of said plurality of channels.

7. The DVR as recited in claim 6 wherein said channel guide contains links to locations in said mass data storage unit.

8. The DVR as recited in claim 1 further comprising a pointing device, cooperable with said channel viewer, that allows a user to issue said command.

9. The DVR as recited in claim 1 wherein said channel viewer presents said portion nonlinearly.

10. The DVR as recited in claim 1 wherein said mass data storage unit receives, digitally compresses and digitally stores said plurality of channels.

11. The DVR as recited in claim 1 wherein said mass data storage unit is a redundant array of independent disks (RAID).

12. The DVR as recited in claim 1 further comprising an archive storage unit, coupled to said channel viewer, that stores said portion.

13. The DVR as recited in claim 1 further comprising a channel selector, coupled to said mass data storage unit, that allows a user to identify said plurality of channels.

14. The DVR as recited in claim 1 wherein said mass data storage unit comprises a separate disk volume for each of said plurality of channels.

15. The DVR as recited in claim 1 wherein said mass storage unit comprises a separate physical disk for each of said plurality of channels.

16. The DVR as recited in claim 1 wherein said plurality of channels are formatted in a selected one of:

NTSC analog TV,

PAL/SECAM analog TV, digital TV, analog HDTV, and digital HDTV.

17. The DVR as recited in claim 1 wherein said DVR selectively moves by one commercial time unit within said one of said plurality of channels in response to a second received command.

18. The DVR as recited in claim 17 wherein said received command is employable to achieve catch-up viewing.

19. A method of operating a digital video recorder, comprising the steps of:
   receiving a plurality of television broadcasts, each television broadcast including a video signal; and
   concurrently and continuously digitally storing said plurality of television broadcasts on a mass data storage unit and storing said plurality of television broadcasts together with time information to allow said plurality of stored television broadcasts to be synchronized with respect to one another upon replay of said stored television broadcasts.

20. The method as recited in claim 19 further comprising creating pointers to locations in said mass data storage unit in a channel guide database.

21. The method as recited in claim 19 further comprising the step of displaying a channel guide on a video display device, said channel guide providing information regarding a content of at least one of said plurality of channels.

22. The method as recited in claim 21 wherein said channel guide contains links to locations in said mass data storage unit.

23. The method as recited in claim 19 further comprising the step of receiving a command to replay one of said stored television broadcasts.

24. The method as recited in claim 23 wherein said one of said stored television broadcasts is displayed nonlinearly.

25. The method as recited in claim 19 wherein said step of concurrently and continuously digitally storing comprises the step of receiving, digitally compressing and digitally storing said plurality of channels.

26. The method as recited in claim 19 wherein said mass data storage unit is a redundant array of independent disks (RAID).

27. The method as recited in claim 19 further comprising the step of storing one of said television broadcasts in an archive storage unit.

28. The method as recited in claim 19 further comprising the step of allowing a user to identify said plurality of television broadcasts in a channel selector.

29. The method as recited in claim 19 wherein said mass data storage unit comprises a separate disk volume for each of said plurality of television broadcasts.

30. The method as recited in claim 19 wherein said mass storage unit comprises a separate physical disk for each of said plurality of television broadcasts.

31. The method as recited in claim 19 further comprising the step of decoding said plurality of television broadcasts from a selected one of:
   NTSC analog TV,
   PAL/SECAM analog TV,
   digital TV,
   analog HDTV, and
   digital HDTV.

32. The method as recited in claim 19 further comprising the step of selectively moving by one commercial time unit within said one of said plurality of television broadcasts in response to a received command.

33. The method as recited in claim 32 wherein said step of selectively moving comprises the step of engaging in catch-up viewing.

* * * * *